(12) United States Patent
Lacroix

(10) Patent No.: US 6,378,388 B1
(45) Date of Patent: Apr. 30, 2002

(54) CONTROL PANEL WITH DOUBLE ROTARY CONTROL FOR A MOTOR VEHICLE

(75) Inventor: Louis Lacroix, Champigny sur Marne (FR)

(73) Assignee: Valeo Electronique, Creteil Cedex (FR)

( * ) Notice: Subject to any disclaimer, the term of this patent is extended or adjusted under 35 U.S.C. 154(b) by 0 days.

(21) Appl. No.: 09/529,359

(22) PCT Filed: Jul. 28, 1999

(86) PCT No.: PCT/FR99/18620

§ 371 Date: Apr. 12, 2000

§ 102(e) Date: Apr. 12, 2000

(87) PCT Pub. No.: WO00/09353

PCT Pub. Date: Feb. 24, 2000

(30) Foreign Application Priority Data

Aug. 12, 1998 (FR) ............................................. 98 10341

(51) Int. Cl.⁷ ................................................ F16H 35/18
(52) U.S. Cl. ..................................... 74/10.85; 74/10.45
(58) Field of Search .............................. 74/10.85, 10.8, 74/10.45, 10.27, 89.18

(56) References Cited

U.S. PATENT DOCUMENTS

| | | | |
|---|---|---|---|
| 3,411,541 A | | 11/1968 | Hindman et al. |
| 3,858,129 A | * | 12/1974 | Ashida et al. ................. 334/78 |
| 4,045,739 A | * | 8/1977 | Kawasaki ..................... 325/15 |
| 4,816,629 A | * | 3/1989 | Cummings .................. 200/6 R |
| 4,995,554 A | * | 2/1991 | Auvity et al. .................. 236/51 |
| 5,093,764 A | | 3/1992 | Hasegawa et al. |
| 5,924,332 A | * | 7/1999 | Ozeki ......................... 74/502.4 |
| 6,031,226 A | * | 2/2000 | Parekh et al. ............. 250/250.5 |

FOREIGN PATENT DOCUMENTS

| | | |
|---|---|---|
| DE | 28 08 661 | 9/1979 |
| FR | 2 693 408 | 1/1994 |

* cited by examiner

*Primary Examiner*—David Fenstermacher

(57) ABSTRACT

The invention concerns a control panel for a motor vehicle system comprising a housing supporting at least a double control unit formed by two rotating knobs arranged projecting relative to the housing and respectively coupled with two shafts, which are capable of being connected to the system elements. One of the shafts bears a coaxial worm screw for driving in rotation a toothed wheel about an axis orthogonal to the shaft axis, said toothed wheel capable of being functionally coupled with a first member of the system, while the other shaft is parallel to the first shaft and is capable of being functionally coupled with a second member of the system. The invention is particularly applicable to heating-ventilating and/or air conditioning systems.

12 Claims, 2 Drawing Sheets

CONTROL PANEL WITH DOUBLE ROTARY CONTROL FOR A MOTOR VEHICLE

BACKGROUND OF THE INVENTION

The invention relates to a control panel for a motor vehicle system, such as, for example, a heating, ventilating and/or air conditioning system for the passenger space of the vehicle.

It more particularly relates to a control panel of the type comprising a housing supporting at least one double control unit formed by two coaxial rotating knobs disposed projecting relative to the housing and respectively coupled with two shafts, which are capable of being connected to the elements of the system.

Control panels of this type are already known, in particular from the publication FR 2 756 067 by the Applicant, or also from publications FR 2 631 719, FR 2 693 408 and U.S. Pat. No. 5,093,764.

BRIEF SUMMARY OF THE INVENTION

One of the objects of the invention is to reduce the spatial requirement of a control panel of the above-mentioned type so as to be able to integrate it more easily in a dashboard of a motor vehicle.

Another object of the invention is to obtain a control panel which has a narrow facade to form a control panel of the extra-flat type.

For this purpose the invention proposes a control panel of the type defined in the introduction, in which one of the shafts, or first shaft, bears a coaxial worm screw capable of driving in rotation a toothed wheel around an axis orthogonal to the axis of the shaft, the said toothed wheel being capable of being functionally coupled with a first element of the system, and in which the other shaft, or second shaft, is parallel to the first shaft and is cable of being functionally coupled to a second element of the system.

The joint use of a worm screw and of a toothed wheel contributes towards reducing the spatial requirement of the control panel, given that this screw and this wheel can occupy a confined space which is relatively flat.

By the expression "toothed wheel" is understood both a complete toothed wheel as well as a toothed sector.

Other optional complementary or alternative characteristics of the invention are given below:

the one of the first shaft and of the second shaft is coaxial with the control knobs.

The second shaft is coaxial with the control knobs and is directly driven by one of the knobs, called "second knob", whereas the first shaft is indirectly driven by the other knob, called "first knob".

The first knob is fixed in rotation with an annular gear which meshes with a toothed pinion fixed in rotation with the worm screw.

The toothed wheel is fixed in rotation with a control lever.

The control lever is connected to a control cable, which is connected to the first element of the system.

The axis of the toothed wheel is substantially perpendicular to a bottom wall of the housing.

The second shaft has a free end which is directly connected to the second element of the system.

The second shaft has a free end which is indirectly connected to the second element of the system.

The second element of the system is a rotary switch.

The panel comprises a double control unit and at least one cursor control disposed projecting relative to the housing.

The panel comprises a double control unit and two cursor controls disposed on either side of the double control unit.

The panel comprises two double control units having parallel axes.

BRIEF DESCRIPTION OF THE DRAWINGS

In the following description, given only by way of example, reference is made to the attached drawings, in which.

DETAILED DESCRIPTION OF THE INVENTION

Figure 1:
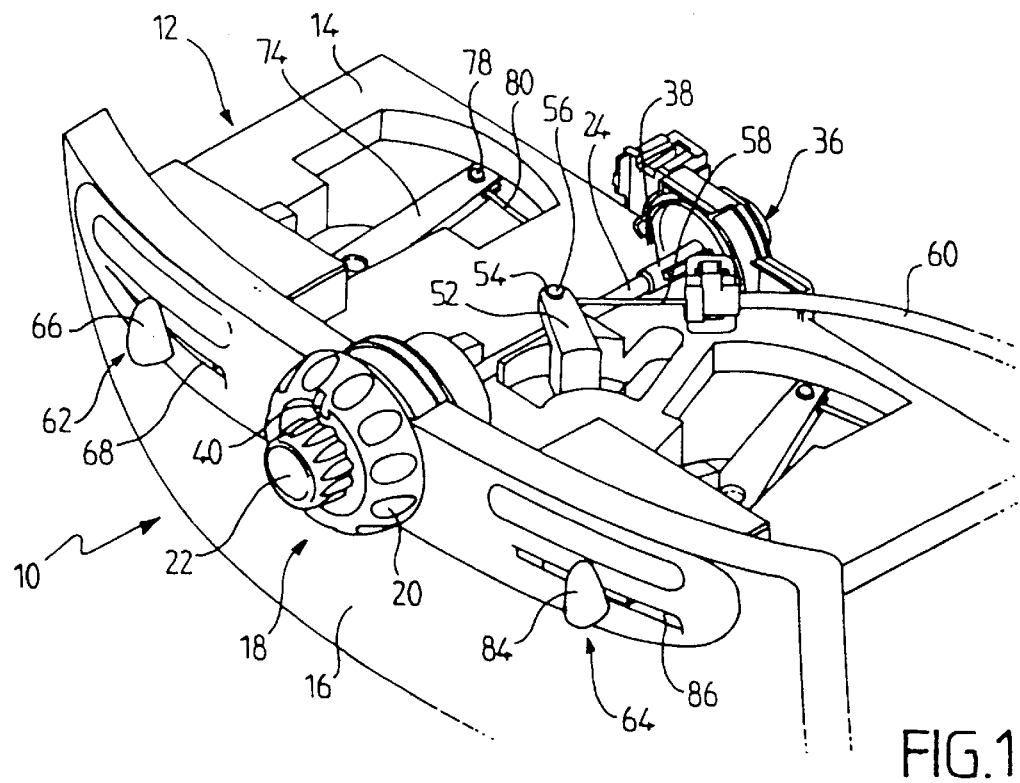
FIG. 1 is a perspective view of a control panel according to a first embodiment of the invention.

Reference is firstly made to FIG. 1 which shows a control panel 10 according to the invention that is intended to form part of a system for heating-ventilating and/or air conditioning the passenger compartment of a motor vehicle.

This panel comprises a housing 12 essentially comprising a bottom wall 14 forming a plate with a general rectangular shape and a facade 16 intended to be embedded in the dashboard (not represented) of the vehicle.

The control panel 10 comprises a double control unit 18 disposed substantially in the central portion of the facade 16 and comprising two coaxial rotary knobs, i.e. a first knob 20, also called "outer knob", and a second knob 22, also called "inner knob". These two knobs are disposed projecting relative to the facade 16 of the control panel. In the example, knob 20 serves to regulate the temperature of the air sent into the passenger compartment, whereas knob 22 serves to regulate the speed of the pulsing device (not represented) serving to pulse air into the passenger compartment.

Figure 3:
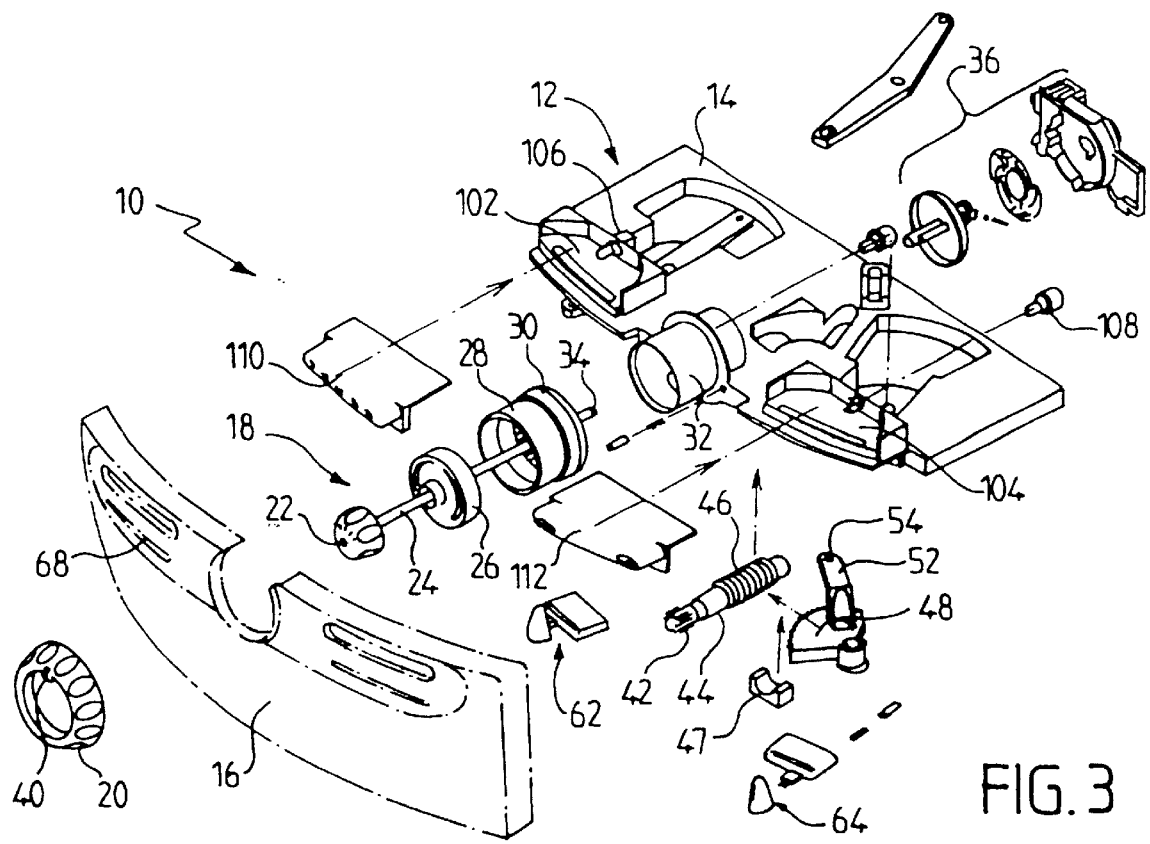
FIG. 3 is an exploded view of the control panel of FIGS. 1 and 2.

As can be seen better on FIG. 3, knob 22 is connected to a shaft 24, also called "second shaft", which successively passes through a disk 26 bearing marks and a drum 28 connected with an annular gear 30 bearing internal toothing. The drum 28 is guided by a cylindrical bearing surface 32 forming an integral part of the housing 12. The shaft 24 has a free end 34 which is provided to be directly coupled to a switch 36 which forms an element of the system and serves to regulate the rotational speed of the pulsing device (not represented) which the system has. For this purpose, the end 34 of the shaft 24 is capable of being received in a muff 38 which the switch 36 has.

The knob 20 (FIGS. 1 and 3) comprises an index 40 enabling its adjustment on the drum 28. Thus, the annular gear 30 may be driven in rotation in one direction or in the other direction by the knob 20.

The annular gear 30 (FIGS. 2 and 3) mesh with a toothed pinion 42 fixed on a shaft 44, called "first shaft", on which a worm screw 46 is also fixed. The shaft 44 is held in position by a clamp 47 fixed to the base wall 14. Thus, the first knob 20 and the second knob 22 are capable of driving in rotation respectively a first shaft 44 and a second shaft 24, which extend parallel to one another. The driving of the shaft is performed with a transmission ratio, whereas the driving of the shaft 24 is direct.

The worm screw 46 is capable of cooperating with a toothed sector 48 (FIGS. 2 and 3) which is capable of pivoting around an axis 50 which extends orthogonally to the axis of the shaft 44. Moreover, this axis 50 extends perpendicularly to the plane of the base wall 14, with the result that the worm screw 46 and the toothed wheel 48 occupy a relative flat and narrow space and which may be at least partially contained in the thickness of the base wall.

The toothed sector 48 is fixed in rotation with a lever 52 comprising a notch 54 capable of receiving a pin 56 provided at one end of a control cable 58 which passes through a sleeve 60 (FIG. 1). The other end of the cable is intended to operate a regulating valve (not represented) serving to adjust the temperature of the air sent into the passenger compartment.

Figure 2:
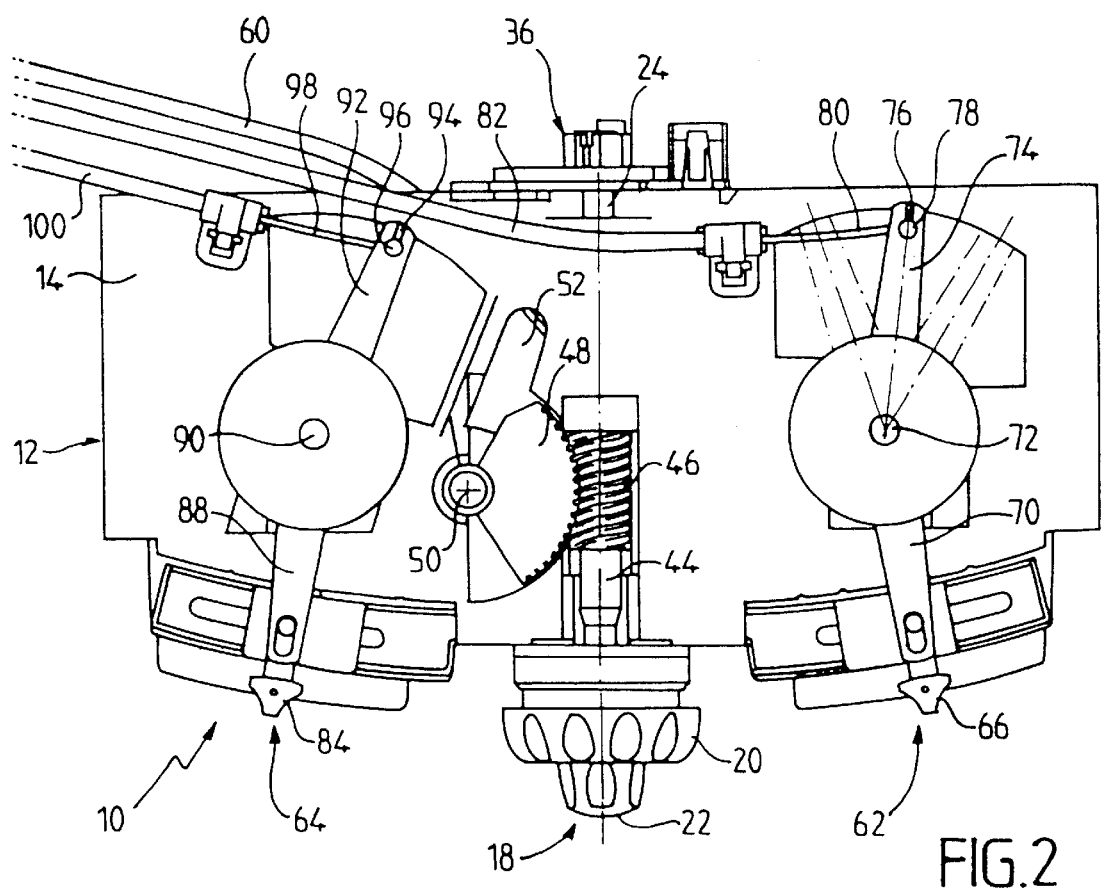
FIG. 2 is a bottom view of the control panel of FIG. 1.

The control panel of FIGS. 1 to 3 also comprises two cursor controls 62 and 64 disposed on either side of the double control unit 18. The control 62 comprises an actuating pull 66 passing through a slot 68 of the facade and actuating a lever 70 mounted to rotate around an axis 72 and fixed in rotation with another lever 74. This lever 74 has a notch 76 capable of receiving a pin 78 provided at the end of a cable 80 passing through a sleeve 82. The cable 80 is capable of actuating, in the example, an air intake control (not represented) serving to supply the system either by the outer air drawn outside the passenger compartment, or the recirculated air drawn inside the passenger compartment.

The control 64 comprises an actuating pull 84 passing through a slot 86 of the facade. This actuating pull operates a lever 88 pivoted around a shaft 90 and integral with another lever 92. The latter has a notch 94 capable of receiving a pin 96 mounted at the end of a control cable 98 passing through a sleeve 100. The other end of the cable 98 is capable of being connected to another element of the system, in the example to a control serving to distribute air between different distribution nozzles opening into the passenger compartment.

Thus, as can be seen better in FIGS. 1 and 2, all the above-mentioned control elements occupy a small space and enable a control panel of the "extra flat" type to be formed, which can easily be housed in the dashboard of the vehicle.

As can be seen more particularly in FIG. 3, the housing of the control panel also comprises two light boxes 102 and 104 which are capable of receiving respective bulbs 106 and 108, these light boxes being masked by respective screens 110 and 112 bearing different symbols or marks.

Figure 4:
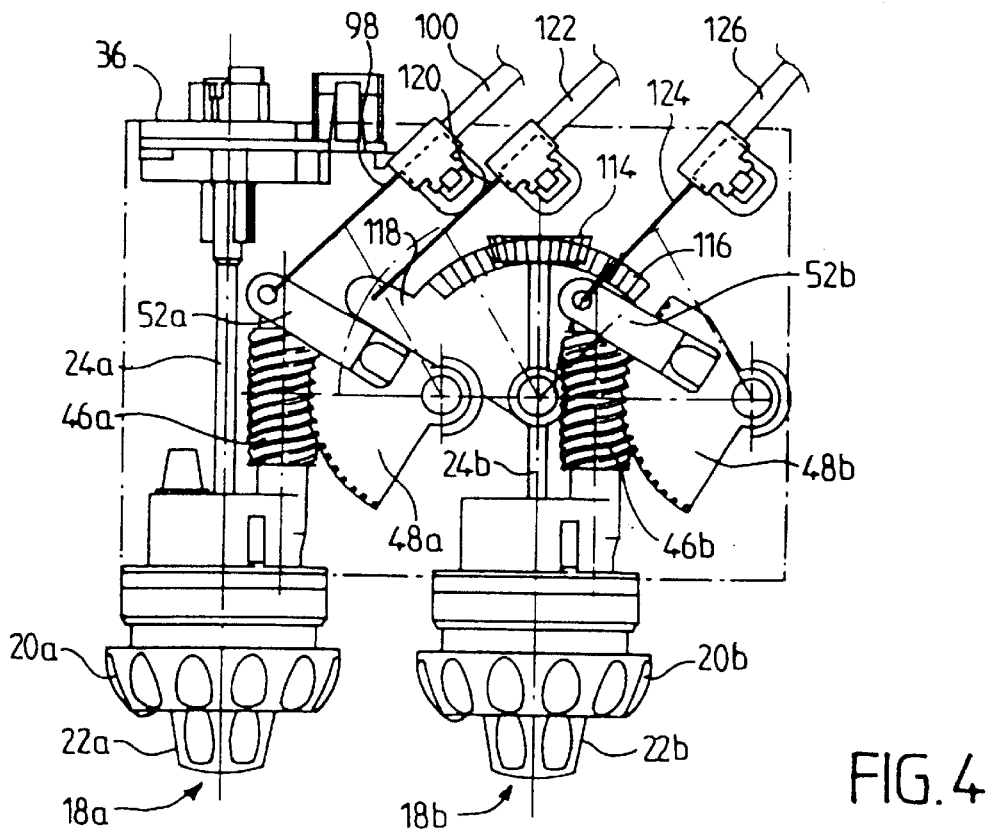
FIG. 4 is a bottom view of a control panel according to a second embodiment of the invention.

In the embodiment of FIG. 4, to which reference is now made, the control panel comprises two double control units 18a and 18b that respectively comprises two coaxial knobs 20a and 22a, and two coaxial knobs 20b and 22b. The knob 22a directly drives a shaft 24a whereas the knob 20a drives a worm screw 46a around an axis parallel to that of the shaft 24a.

In a corresponding manner, the knob 22b directly drives a shaft 24b, whereas the knob 20b indirectly drives a worm screw 46b around an axis parallel to that of the shaft 25b. As can be seen in FIG. 4, the respective axes of the shaft 24a, of the worm screw 46a, of the shaft 24b and of the worm screw 46b are parallel and situated in the same plane, which corresponds to the general plane of the base plate of the housing. The shaft 24a directly drives a switch 36 similar to that previously described. The worm screw 46a meshes with a toothed wheel 48a locked in rotation with a lever 52a which acts on a cable 98 similar to that described in the embodiment of FIG. 1 to 3.

The shaft 24b is equipped with a toothed pinion 114 which meshes with a toothed sector 116 fixed in rotation with a lever 118 that actuates a cable 120 passing though a sleeve 122.

The worm screw 46b meshes with a toothed sector 48b fixed in rotation with a lever 52b that actuates a cable 124 passing through a sleeve 126.

It will be understood that the cables 120 and 124 can play the role of cables 80 and 98 of the previous embodiment, the difference being that these cables are operated not by pull mechanisms, but by a coaxial double control unit.

The embodiment of FIGS. 1 to 3 consequently uses one double rotary control unit and two pull controls to perform a total of four controls. This embodiment has various advantages, including a limited height requirement and a gain in facade surface. The speed multiplication between the control knob and the endless screw enables a very gentle and pleasant control sensation to be experienced. Moreover, the use of a control unit comprising an endless screw and toothed wheel enables there to be an irreversible control.

The embodiment of FIG. 4 enables the use of two double control units to perform a total of four controls. These two double control units are similar to those described in the first embodiment of the invention. Therefore four controls are produced on two parallel axes. The main advantages involve the limited height and width requirement, which enables a gain in facade surface to be achieved.

Furthermore, the use of these double knobs and their integration in control panels of the extra-flat type allow important gains with respect to the decoration which is then made at the level of the knobs.

It may also be envisaged performing the direct control by a wheel and worm screw system, with a knob at the centre connected to an axle comprising a worm screw meshing with a pinion connected to a lever.

Of course, the invention is not limited to the embodiments that were previously described by way of example and it extends to other variants.

What is claimed is:

1. A control panel for a vehicle system, comprising a housing supporting at least one double control unit formed of two coaxial rotary knobs disposed projecting relative to the housing and coupled respectively to first and second shafts, which are capable of being connected to elements of the system, wherein the first shaft bears a coaxial worm screw capable of driving in rotation a toothed wheel around an axis orthogonal to the axis of the first shaft, said toothed wheel being capable of being functionally coupled with a first element of the system, and wherein the second shaft, is parallel to the first shaft and is capable of being functionally coupled to a second element of the system.

2. A control panel according to claim 1, wherein the first shaft is coaxial with the control knobs.

3. A control panel according to claim 2, wherein the second shaft is coaxial with the control knobs and is directly driven by a second knob of the two coaxial rotary knobs and the first shaft is indirectly driven by a first knob of the two coaxial rotary knobs.

4. A control panel according to claim 3, wherein the first knob is fixed in rotation with an annular gear which meshes with a toothed pinion fixed in rotation with the worm screw.

5. A control panel according to claim 1, wherein the toothed wheel is fixed in rotation with a control lever.

6. A control panel according to claim 5, wherein said control lever is connected to a control cable, which is connected to the first element of the system.

7. A control panel according to claim 1, wherein the axis of the toothed wheel is substantially perpendicular to a bottom wall of the housing.

8. A control panel according to claim 1, wherein the second shaft has a free end which is directly connected to the second element of the system.

9. A control panel according to claim 1 wherein the second shaft has a free end which is indirectly connected to the second element of the system.

10. A control panel according to claim 8 wherein the second element of the system is a rotary switch.

11. A control panel according to claim 1 comprising a double control unit and at least one cursor control disposed projecting relative to the housing.

12. A control panel according to claim 11, comprising a double unit and two cursor controls disposed either side of the double control unit.

\* \* \* \* \*

UNITED STATES PATENT AND TRADEMARK OFFICE
CERTIFICATE OF CORRECTION

PATENT NO. : 6,378,388 B1  Page 1 of 1
DATED : April 30, 2002
INVENTOR(S) : Louis Lacroix It is certified that error appears in the above-identified patent and that said Letters Patent is hereby corrected as shown below:

<u>Title page,</u>
Item [86], after "PCT No.", please delete "PCT/FR99/18620", and insert
-- PCT/FR99/01862 --.

Item [56], before "*Primary Examiner*-David Fenstermacher", please insert
-- *Attorney Agent or Firm* - Morgan & Finnegan, LLP --.

<u>Column 6,</u>
Line 18, please insert claim 13 as follows:

-- 13. A control panel according to Claim 1, comprising two double control units having parallel axes. --

Signed and Sealed this

Eighteenth Day of June, 2002

*Attest:*

*Attesting Officer*

JAMES E. ROGAN
*Director of the United States Patent and Trademark Office*